United States Patent Office

3,425,890
Patented Feb. 4, 1969

3,425,890
STRETCHED-SET RETICULATED POLYURETHANE FOAM AND METHOD OF MAKING SAME
William Richards Powers, Cedar Crest, Penns Grove, N.J., assignor to Scott Paper Company, Philadelphia, Pa., a corporation of Pennsylvania
No Drawing. Continuation of application Ser. No. 423,848, Jan. 6, 1965. This application Dec. 30, 1966, Ser. No. 606,448
U.S. Cl. 161—46            2 Claims
Int. Cl. B29d 7/24, 27/00

ABSTRACT OF THE DISCLOSURE

This invention relates to the production of plastic foam materials in which the foam is distorted and heat set in the distorted state. The distortion arises from stretching and/or compressing the foam.

---

This application is a continuation of application Ser. No. 423,848, filed Jan. 6, 1965, now abandoned, which application is a continuation-in-part of Ser. No. 738,045, filed May 27, 1958, now abandoned.

The present invention relates to non-woven synthetic fabrics, more particularly, to modified bodies of interconnected fibers of high-molecular-weight, polyisocyanate-derived polyurethane polymers characterized by the absence of membranous material in the polymer body. The methods of preparing the novel fabrics are within the scope of the invention.

The conversion of fibrous materials into non-woven fabrics is a well-known art. Matted fibers of both natural and synthetic materials in random lengths are usually formed into fabrics by felting or by chemically bonding the individual fibers together. Felting, of course, depends upon the natural interlocking characteristics of the fibers. Chemical bonding may result from substantial impregnation of the fibrous structure with a resinous bonding agent or there may be employed a discontinuous binder pattern in which only selected fibers are united to provide a skeletal framework in which the remaining fibers are locked.

The broad object of the present invention is to provide a non-woven fabric-like material which comprises relatively short filaments (strands) of a synthetic resinous material joined together by terminal bonds (nexus) of the identical resinous material, said material being characterized by the substantial absence of membranous matter.

Materials consisting of strands and nexus may be of different forms such as those compressed in one or more directions (i.e., $x$ and $y$ axis), set materials, stretched in one or more directions (i.e., $x$ and $y$ axis), compressed and set materials and compressed materials of one or more directions and of variable density.

Another object of my invention is to provide a non-woven fabric-like material from a three-dimensional skeletonized, reticulated polymeric structure that is inherently stronger and more resistant to rupture or disintegration than a comparable body of matted fibers of the basic polymeric resin.

A further object of my invention is to provide a simple method for producing modified bodies of membraneless interconnected polymeric fibers in the form of non-woven fabric-like materials.

Other objects and advantages of the present invention will be readily apparent from the following detailed description of certain preferred embodiments thereof.

The preferred polymeric structure upon which the manifold forms of my invention are based is a three-dimensionally reticulated celliform of flexible, foamed, isocyanate-polyurethane-derived polymer. Isocyanate-derived polymers are considered to be synthetic resinous materials wherein polyisocyanate radicals are included in the polymer chain where they act as chain-extending and cross-linking media. The isocyanate-derived polymers are designated in accordance with the types of polymeric groups forming the major portion of the ultimate molecule, which groups may be polyesters, polyethers, polyether amines or the like. Thus, an isocyanate-derived polymer may be a polymeric-polyester-polyurethane, a polymeric-polyether-polyurethane, and so forth.

Foamed cellular structures comprising isocyanate-derived polymers are well known. If the foaming process in polyurethane manufacture is allowed to continue until a low-density structure is produced, an open-cell product may be obtained. In an open-cell structure a majority of the cell faces are ruptured, and the cells are intercommunicating, i.e., there is still a considerable portion of membranes present covering the cell faces, but each cell is intercommunicating with the other through a membraneless face of the cell. Open-celled isocyanate-derived polymer-foamed cellular structures may be of very low density, for example, as light as 2 pounds per cubic foot or less.

Depending on the molecular structure of the polymer, the foamed cellular materials range from rigid and board-like to soft and flexible. Flexible isocyanate-derived polymer-foamed cellular structures are resilient and recover their original shape after deformation. In general, polyurethane foams in their idealized state consist of dodecahedrons having pentagonal facets or faces. In non-reticulated foams, membranes cover some of the faces.

By a treatment further described herein, isocyanate-derived polymeric cellular structures may be converted to skeletonized, three-dimensionally reticulated structures comprising a three-dimensional network of polymer strands joined at spaced-apart points into nexus defining the skeletal outline of the original cellular structure. For all practical purposes all the membranes have been removed from this structure. This membraneless structure is defined herein as a "reticulated" structure. It may also be called a skeletonized polyurethane foam.

Low-density foamed polymeric cellular structures are produced by expansion of bubbles of gas or vapor within a mass of polymer in the plastic state. As the bubbles expand, they contact one another and are deformed from a spherical shape into the previously-mentioned polyhedral configuration.

Optimum packing for identical spheres is such that each sphere is surrounded by 12 others; accordingly, it has been found that cellular structures foamed to low density comprise strands and membranes of polymer defining the edges and faces of cells of a generally dodecahedral shape, with pentagonal sides, facets, or faces. Within any foamed structure, cells will be found of varying shapes, but a cell of approximate dodecahedral shape is the general rule.

When the cells have expanded to the point of contact and formed polyhedral cells, the remaining gas pressure generally ruptures one or more common cell faces to produce an open-cell structure; that is, a structure in which the cells are intercommunicating.

In a preferred embodiment of the present invention, the soft, resilient, open-cell, isocyanate-derived polymer-foamed celliform structure is a highly-porous, integrally-formed, three-dimensionally reticulated structure as prepared in accordance with the disclosure of copending applications Ser. No. 655,368, filed Apr. 26, 1957, now abandoned, and Ser. No. 345,352, filed Feb. 17, 1964, now U.S. Patent 3,171,820.

As mentioned above, low-density, isocyanate-derived polymer foams have an open-cell cellular structure in which strands of the polymer define the edges, and membranes of the polymer define the faces of polyhedral cells. In accordance with the processes disclosed in the aforesaid copending applications, it has been discovered that the membranes can be removed from the faces of the cells, leaving a highly porous reticulated network of the polymer strands which may be regarded as a "skeletonized" foam. This skeletonization or removal of cell faces, commonly known in the foam art as "reticulation," can be accomplished by treating isocyanate-derived polymer-foamed cellular structures according to the processes described in the previously mentioned Ser. No. 345,352.

The highly porous nature of the skeletonized foams obtained by these processes make these foams particularly easy to heat in the instant process.

In order to describe the product with language appropriate to embrace the various products such as the compression set structure, the tension set structure, and the compression-tension-set structure, reference is made to a polyhedron (in the idealized state, a dodecahedron) which assumes various shapes in response to the applied force.

Generally, the present product may be described as an article of manufacture, a dimensionally stable when-at-rest body of a polyurethane resin skeleton structure (substantially all membrane-free) consisting of strands and nexus substantially all the cells of which are elongate polyhedrons whose height is approximately between the thickness of a strand of said resin skeleton structure polyhedron and 40% of their width or 40% of their original height. A non-rigid resilient polyurethane resin is preferred; the non-fused products, i.e., those structures where the strands and nexus are not inseparably (destructively) joined together are likewise preferred.

In the tension-set product a substantial proportion of strands is linear and at higher elongations, such as 200%, the polyhedrons are tube-like or tubular.

In the compression-set product a substantial portion of the strands is non-linear.

In the tension-compression-set product the strands are a mixture of linear and non-linear with the height of the deformed polyhedrons or tubes collapsed to about a single-strand thickness.

The non-rigid, resilient polyurethane structures of the various embodiments are preferred. Although rigid polyurethanes may be treated before they have become rigid, numerous problems inherent in subjecting these foams to various forces render the products unattractive (except those rigid resins which stay resilient for a period because of their long cure times).

The term "dimensionally stable when-at-rest body" as herein defined means a structure that does not substantially change its shape when subjected only to normal gravitational force at room temperature and normal humidity conditions. In other words, the body does not substantially change dimensions once it has been set in its new form.

The term "non-rigid" as defined herein means a structure which, if subjected to bending force in the form of a rod the radius of which is three times the thickness of the sample, will bend through an angle of 180° and recover its shape.

The term "resilient" resin reticulated structure means a resin structure which, if subjected to a force sufficient to distort the polyhedrons will tend to revert to its original shape before the application of the force.

These novel structures resulting in perpendicular compression (force perpendicular to $x$ and $y$ axes) have a Poisson's ratio (i.e., change in size or ratio of the compressed v. the uncompressed foam) that stays nearly constant. Poisson's ratio data thus allow the conclusion that in perpendicular compression there is substantially no change in the foam in the $x$ and $y$ direction. As can be envisioned, if the direction of a unidirectional (monovectorial) force departs from the perpendicular through a given angle, various products will be obtained until ultimately a tension set product (90° departure from perpendicular) is obtained. However, the degree of deformation at each of these angles may vary over a wide range and thus at perpendicular compression (0° of force) the compressed material may be of from about 5% of its original thickness (95% compressed) to about 40% of its original thickness (60% compressed). As can be readily appreciated, the Poisson's ratio has meaning only at perpendicular compression. Tensioning and setting the foam again may vary over a considerable range. Elongation limit will be dictated only by the strength of the elongated foam. Elongation in more than one direction is possible by polyvectorial forces. If the foam is tension elongated in one direction, more and more of the strands tend to assume a parallel relationship. However, at least two faces, generally at each end of the previous dodecahedron, define the new shape which is somewhat cylindrical or truncated cylindrical (the ends representing an ellipse) or tubular. Other strand members of the tubular polyurethane structure tend to gird the tubular form and define the girth of this tube. Obviously, the tubular shape is an idealized form and therefore various departures from this form, such as a barrel, a truncated cone, an hourglass, etc. and mixtures of these are found throughout this body, depending on the girth of the cylinder-defining strands. If this tubular foam structure is subsequently compressed with a force perpendicular to the longitudinal axis of the cylinder, the foam structure is again of a different form. For example, the cylinder will be reduced in radius and it will tend to assume an elliptical shape until the cylinder is finally fully collapsed and thus the thickness of the strands will define its limit.

In the above discussion an idealized material has been envisioned; in fact, each strand and nexus as well as a cluster of these possess slightly varying tension and compression responses to a constant force. Therefore, each strand and nexus will depart from the idealized state and in cases such as tension set will exhibit properties still resembling a polyhedron although tending to become more and more cylindrical.

Also, in compression the idealized polyhedron will tend to first become an ellipsoid and then flatten out more and more. At some stage in the compression the structural differences in each strand and nexus will cause the ellipsoid to collapse and the resulting product will be an intertwined but non-fused product of nexus and strands. The intertwined compressed product is the preferred product embodiment. However, these intertwined strands, in general, do not lie very much above or below a plane drawn perpendicular to the force through the center of a polyhedron. At most, these departures from the plane are the largest dimension of a nexus or a strand. At low compression ratios some of the strands may buckle and assume a position parallel to that of the compressive force. In these instances the ideal departure from a plane drawn perpendicular to the force through the center of the polyhedron would be no more than half of the length of the longest strand. However, at higher compression ratios the polyhedron tends to flatten out until it is no thicker than the nexus and ultimately, because of the triangular nature of the strands, no thicker than one strand. The last result is due to the edges of the strands being deformed, though, normally, the thickness of the polyhedron will be about twice the thickness of an individual strand.

In discussing the various shapes the polyhedrons will take it has been tacitly assumed that an idealized shape of a polyhedron has been obtained when the foam is blown. Actually, the height of the polyhedron is a function of the polyurethane casting technique. For example, if the mold width is small in relationship to its height the polyhedron's major and minor axis ratio may be as high as 10 and higher. Of course, this product is not within the contemplation of the present invention. If, however, this product were compressed and stretched and the original height of the polyhedron reduced and set to about the minimal one-strand thickness up to 40% of its original height and further reticulated, then the product would be within the contemplated scope of the invention.

Some foams that are not "free blown" but are expanded to fill a mold likewise possess polyhedrons whose shapes do not approximate the ideal spherical shape.

Further, still other foams are blown in a manner such that a skin is formed on their surfaces. This type of foam is generally unreticulated and, therefore, it does not fall within the contemplation of this invention. However, if reticulated and set, this product forms part of the invention and, therefore, reference is made to the original polyhedron when the reduction in height is involved.

Generally, foams compressed by the novel technique do recover their original shape when subjected to an appropriate swelling agent or mixture of swelling agents. Representative swelling agents are dimethylacetamide and halogenated hydrocarbons. This swelling method allows an approximate determination of the original shape of the polyhedrons.

Another invention contemplated herein is an article of manufacture dimensionally stable when-at-rest unitary body of a nonrigid resilient polyurethane resin-reticulated skeletonized structure substantially all of the cells of which are polyhedrons whose heights vary in at least one direction from approximately a spherical polyhedron to a polyhedron whose height is approximately the thickness of a strand of said polyhedrons of said resin-skeleton structure.

A variation of the same embodiment is as above where the polyhedrons vary in a progressive uniform manner in at least one direction from approximately a spherical polyhedron to a polyhedron whose height is approximately the thickness of a strand of said polyhedrons of said resin-skeleton structure.

The above products are obtained, in case of compression products, by keeping one of the compressing surfaces hot while the other is kept cold. Depending on the degree of compression, the temperature and the duration of compression, various products are obtained having a variation of polyhedrons ranging all the way from nearly perfect dodecahedrons to completely flat surfaces. If compression is carried out in two directions variable configuration structures may be obtained.

Tension set and tension-compression-set products may also be obtained with various polyhedron configurations. These range all the way from structures having slight elongation to nearly parallel strands. These products are obtained by uniformly heating and then setting only a portion of a structure under tension.

One class of intermediate polymers from which foamed isocyanate-derived polymer-cellular structures may be produced comprises polyesters. The intermediate polymer in this case is an alkyd resin or polymeric polyester prepared by reaction of a polyfunctional acid with a polyfunctional alcohol, such as adipic acid and a glycol, usually under such conditions that there will be contained therein predominantly hydroxyl terminal groups.

Various modifications may be made in the polyester; for example, as a substitute for a portion of the polyfunctional alcohol, which is usually a dihydric alcohol, such as glycol, or a dihydric ether alcohol, there may be used a trifuntional alcohol such as glycerine. Usually, excessive amounts of trifunctional and higher alcohols are avoided to obviate the possibility of excessive cross-linking within and gelling of the polyester.

The polyfunctional acid employed is generally a straight-chain aliphatic acid such as adipic acid, but may include an aromatic acid such as phthalic acid or an olefinic acid such as maleic acid. If the polyester contains an unsaturated acid, side chains can be introduced by additional polymerization to produce, for example, styrene-modified polyesters.

Another variation in polyesters is produced by adding to the charge during the synthesis an oil, that is, a triglyceride, which can enter into the polyester chain by transesterification. Advantageously, the oil may contain free hydroxyl groups, as exemplified by castor oil. It has recently been reported that polyesters can be prepared from lactones, in which reaction a single starting material acts in itself as both acid and alcohol in producing a polymeric polyester chain.

The polyol with which the polyisocyanate is reacted may be a polyester, in which case the polymer obtained may be designated a polymeric polyester polyurethane.

Another class of polyols with which polyisocyanates may be reacted to form foamed open-cell cellular structures comprises polyethers. Illustrative of polyethers from which foamed cellular structures of polymeric polyether polyurethanes may be prepared are aliphatic alkylene glycol polymers, as exemplified by polypropylene glycol and poly-1,4-butylene ether glycol. Additionally, polyether molecules may include the residues of a variety of compounds, such as amines and the like, which are reactive with alkylene oxides, from which latter compounds polyethers are prepared. Such modified polyethers may also be used for preparation of polyurethane cellular structures. In another variation, a polyether may be modified by reaction with an epoxy resin prior to or concurrently with the polyisocyanate reaction and production of a foamed cellular product. Procedural details and variations which may be made in selection of the nature of the polyether used, the polyisocyanate with which it is reacted, and so forth, are well known in the art.

The pore size of cellular structures produced in isocyanate-derived polymer synthesis may be controlled as desired, by added foam-stabilizing or coalescing agents. In general, suitable starting foams are those having of from about 5 pores per lineal inch (p.p.i.) to about 125 p.p.i. Foams having of from about 10 p.p.i. to about 60 p.p.i. are preferred, while those having of from about 25 p.p.i. to about 45 p.p.i. are the most preferred. The flexibility of the products may be varied by judicious selection of secondary polymer and isocyanate with respect to chain branching, steric hindrance of rotation and similar considerations.

The preparation of foamed isocyanate-derived polymer cellular structures is well understood in the art, and is described, for example, in German Plastics Practice published by Debell and Richardson, 1946, Chapter XXI, "Plastic Foams," pages 462—465; Papers Presented at the Atlantic City Meeting: "Angewandte Chemie," vol 62, No. 3, pages 57–66, 1950; Synthesis of Isocyanate Polymers, published by the Division of Paints, Plastics and Printing Ink Chemistry, American Chemical Society, 1956; and in patent literature. To the extent that soft, resilient, low-density, open-cell foamed-cellular structures can be prepared from isocyanate-derived polymers, the process of this invention, which is independent of the chemical nature of the polymer, is applicable thereto.

Compression deformation, as contemplated in this invention, is expressed as a compression ratio or firmness according to the following designation:

$F = T_o/T_f$, where $T_o$ is original thickness and $T_f$ is final thickness

In order to avoid the confusing use of percent compression and percent of original height the firmness number is employed herein to clearly delineate the terms. However, the firmness number as is amply evident can easily be converted to one or the other of the percent terms. In other words, the same limit may be expressed as percent compressed. For example, firmness 2 is 50% compressed or 50% of the original height. Firmness 3 means 33.3% of original height or 66.6% compressed.

Similarly, the elongated foam may be referred to as

Fabric 1 for 100% elongation, Fabric 2 for 200% elongation, etc., and Firm-fabric 2:3 for 50% compressed, 300% elongated and set structure. In this case, the compressed thickness refers to that obtained after the structure has been stretched to the desired length and either set or subsequently immediately compressed.

The means by which the compression is produced are immaterial. Thus, for example, the isocyanate-derived polymer-celliform structure may be compressed between platens of a press and heated in situ, or else compressed between plates held by a suitable tensioning device, the assembly being transferred to a heating area to be set or further compressed. In another embodiment, the reticulated material may be heated in an uncompressed state and then passed through one or more pairs of nipper rolls and heated, if necessary, to maintain the proper temperature level for imparting a permanent set to the material; then the foam may be relaxed and, again, finally compressed to impart the permanent set thereto. The amount of compaction produced in this manner depends upon the time-temperature cycle as well as the nip distance of the rolls as compared to the initial thickness of the reticulated material.

Tension deformation is effected by stretching laterally the celliform material and then holding the material in this position at an elevated temperature until a permanent set is attained. Material embodying a unilateral stretch-set exhibits considerable elasticity in the cross-direction, whereas a bilateral stretch-set or stretch and compression-set substantially immobilizes the material depending on the degree of the final stretch and/or set.

Apparently, owing to the unequal strains set up around a cell membrane when the strands surrounding it are stretched, weak spots develop which cause tears and holes during the setting; for this reason the reticulated product is preferred. I have observed that while it is possible to stretch a fully-reticulated polymeric polyester polyurethane 100% to 150% in both length and width and successfully heat-set the stretched material, attempts to heat-set membrane-possessing polyurethane structures lead to severe tears if the stretching has exceeded about 50%.

Moreover, permeability by a fluid such as air or water differs by several factors, especially in the case of compressed foams, between the reticulated and the membrane-containing material.

The time necessary to effect a permanent set of the reticulated material is dependent upon the nature of the organic polyisocyanate-derived expanded polymeric product employed therein as well as the temperatures involved. The heat applied to the compressed reticulated structure should be such as to produce a structure of permanently compressed dimensions. This temperature may range up to just below the softening point of the polymer; temperatures at or above the softening point must be avoided to obviate melting, excessive fusing and loss of the reticulated structure.

The exact temperatures useful will vary with the nature of the polymer; in general, lower temperatures require longer heat-set times. Temperatures above 100°, and preferably from about 150° to 200° C. are desirable.

For optimum results of approximately constant-density foam it is desirable to heat the reticulated mass as uniformly as possible; therefore, this highly porous material, such as the aforementioned skeletonized foam is conveniently heated with hot air.

Uniform properties are hard to accomplish in the conventional isocyanate-derived polymer-foamed, cellular, open-cell structures possessing membranes, because of poor heat conductivity.

Once the material has been set or fixed in its distorted condition by the heat, the distorting load or compression force may be removed without waiting for the mass to cool; or, if desired, the structure may be cooled under compression. Preferably, the heating is continued until the reticulated structure is set in the dimensions to which it is compressed while the heat is applied. However, it is also possible to heat the polymer to the extent that partial recovery takes place after the compressing force is removed, but recovery of the original dimensions is incomplete. The point at which the distortion becomes fixed can be detected by measurement of the force with which the foam presses back against the compressing force. The time required to arrive at a set stage will, of course, vary, depending on factors like the temperature used, pore size, polymer type and the like.

Conveniently, the isocyanate-derived polymer-reticulated structure will be treated in the form of blocks so that pressure can be applied uniformly. If desired, large blocks may be heat-set under compression under conditions conducive to uniformity and sliced to produce slabs of the desired thickness. Naturally, if the polymer structure is of an irregular contour, some parts will, with a flat compression plate, be compressed more than others, and in this situation a foam may be produced with some parts more uniformly responsive to pressure than others. Conversely, curved platens may be applied to flat blocks of the polymeric material to accomplish the same effect of variable response.

The invention is illustrated but not limited by the following examples:

EXAMPLE 1

This example describes preparation of a polymeric polyester polyurethane.

Component A

Into a closed container equipped with an agitator and means for maintaining a nitrogen gas sweep are charged, at room temperature, 50 parts by weight of an approximately 80:20 isomeric mixture of toluene-2,4-diisocyanate and toluene-2,6-diisocyanate ("Hylene TM" sold by E. I. du Pont de Nemours & Co., Inc., Wilmington, Del.) and 50 parts, by weight, of a polyester resin (alkyd) ("Paraplex U-148" sold by Rohm and Haas Co., Philadelphia, Pa.), having the following properties:

| | |
|---|---|
| Number average molecular weight | 1800–2000 |
| Equivalent weight | 745–830 |
| Hydroxyl number | 65–75 |
| Acid number, max. | 3 |
| Water content, percent max. | 0.25 |
| Average hydroxyls per molecule | 2.42 |

The above-described mixture is agitated under a maintained nitrogen atmosphere for four hours, the temperature rising to approximately 32° C.

Component B

There are blended at room temperature: 80 parts, by weight, of the polyester resin referred to above, 0.6 part, by weight, of a polyoxyethylated vegetable oil dispersing agent ("Emulphor EL-719" sold by General Aniline and Film Corp., New York, N.Y.), 4.5 parts, by weight, of water and 1.9 parts, by weight, of diethylethanolamine.

One hundred parts, by weight, of Component A are added to 87 parts, by weight, of Component B, and thoroughly mixed for about 20 seconds at a starting temperature of about 25° C. The mixture is then immediately poured into a container of sufficient volume to permit expansion. After about 15 minutes the product sets to a cellular mass, the temperature rising to about 75° C. The container, together with the foamed cellular mass, is placed in an oven and held at 70° C. for approximately 16 hours. The product, in the form of an open-celled, foamed mass having carboxylic ester linkages, is removed from the container and cut into blocks.

The blocks have a density of 0.046 gram per cubic centimeter. The proportion of closed cells in the product is very small, and the cell faces have an approximate diameter of 0.3 mm.

EXAMPLE 2

This example describes preparation of a reticulated polymeric polyester polyurethane structure.

Blocks of open-celled polyester polyurethane cellular product prepared as described in Example 1 and having a tensile strength of 28.5 pounds per square inch (2.0 kilograms per square centimeter) are immersed for 45 seconds in a bath at a temperature of 80° C. composed of:

| | Parts by weight |
|---|---|
| Sodium hydroxide | 100 |
| Water | 900 |

The blocks are repeatedly kneaded in the bath to insure thorough penetration of the solution. The blocks are then removed from the bath, washed thoroughly with cold water, and immersed in a 2% aqueous acetic acid solution and repeatedly kneaded therein to neutralize any remaining sodium hydroxide, then washed with water. The blocks are then placed in an oven held at 120° C. and held there for 2 hours. This treatment results in removal of cell faces leaving a fine network of the original strands defining the outlines of the original cells.

EXAMPLE 3

This example describes preparation of a polyalkylene ether glycol polyurethane cellular structure.

Component A

To a closed agitated vessel equipped with a nitrogen gas sweep were charged at 40° C., 100 parts by weight, of a molten polyalkylene ether, reputedly a 1,4-polybutylene glycol having a hydroxyl number of 37.6; water content of 0.04%; and melting point about 35° C. ("Teracol 30" sold by E. I. duPont de Nemours & Co., Inc., Wilmington, Del.). Next 12.6 parts, by weight, of the toluene-2,4- and 2,6-diisocyante mixture employed in Example 1 at a temperature of 35° C. were added and agitation was commenced. There was a mildly exothermic reaction, the temperature rising to 45–50° C. Heat was then applied and the mixture was maintained at 60° C. for 2½ hours. Then an additional 12.6 parts of the diisocyanate were added and the temperature was raised and maintained at 140° C. for 2½ hours. The charge was then cooled to 50° C. and a further 3.7 parts, by weight, of the diisocayante were added and mixed in. Finally, the product was allowed to cool to room temperature, 25° C.

Component B

A blend, at 30° C. was prepared of 51 parts, by weight, of dioctyl sebacate, a plasticizer-softener; 10 parts, by weight, of N-methylmorpholine and 2.5 parts, by weight, of triethylamine catalysts; 5.0 parts, by weight, of a conventional silicone foam stabilizer (Dow Corning DC–200 (50 cst.)); and 22.5 parts, by weight, of water.

To component B were added 1000 parts, by weight, of component A, and the mixture was stirred rapidly for about 20 seconds. Immediately thereafter, the mass was poured into a container of sufficient volume to permit expansion; after about 30 minutes the container, together with the foamed mass, was placed in an oven and maintained at 70° C. for 16 hours. The product in the form of an open-celled cellular structure was removed from the container and cut into blocks. Density of the blocks was about 0.031 g./cc. Pore size was about 0.1 mm. in diameter or about 25 p.p.i.

EXAMPLE 4

This example describes preparation of a skeletal polymeric polyether polyurethane celliform product.

A block of the cellular polymeric polyether-polyurethane foam of Example 3 was immersed and kneaded in a bath composed of:

| | Parts by weight |
|---|---|
| Sodium hydroxide | 200 |
| Water | 900 | at the boil temperature of the bath for a period of 10 minutes. The block was then removed, washed well with cold water, and rinsed with 2% acetic acid to neutralize any residual sodium hydroxide. Finally, it was washed in water and dried at 100° C. for three hours.

Visual examination of the product indicated the membranes covering the cell faces had been removed leaving behind a characteristic porous skeletal structure. Loss of weight was very small, less than 2%.

Tests on this product and on an untreated block of the Example 3 gave the following results:

| | Untreated | Treated |
|---|---|---|
| Tensile strength, p.s.i. | 14 | 20 |
| Softness: | | |
| P.s.i. to compress 10% | 0.36 | 0.18 |
| P.s.i. to compress 20% | 0.47 | 0.25 |
| P.s.i. to compress 30% | 9.51 | 0.30 |
| P.s.i. to compress 50% | 0.61 | 0.40 |

In addition, the high-humidity age resistance was improved by the treatment as indicated by the following results of a 14-day exposure to 100% relative humidity at 90° C.

| | Untreated | Treated |
|---|---|---|
| P.s.i. to compress 25%: | | |
| Sample before aging | 0.50 | 0.31 |
| Sample after aging | 0.37 | 0.34 |
| P.s.i. to compress 50%: | | |
| Sample before aging | 0.64 | 0.45 |
| Sample after aging | 0.52 | 0.47 |

It will be noted that while the untreated sample lost considerable load-bearing capacity on aging, the treated sample was not harmed and indeed appeared to be somewhat improved by the aging.

Thermal conductivity was changed very little by the treatment:

Untreated M B.t.u./hr./ft.$^2$/° F./in. _____ 0.334
Treated M B.t.u./hr./ft.$^2$/° F./in. _____ 0.353

Manual tests indicated a marked increased in tear resistance as a result of the treatment.

EXAMPLE 5

Preparation of a compacted reticulated polymeric polyester polyurethane

A sheet of the product of Example 2 having a thickness of 0.245 inch was placed between metal platens previously heated to a temperature of 180° C. The platens were immediately closed to a distance of 0.020 inch for about one second, then parted to distance of 0.040 inch, and the sheet was maintained in this position at 180° C. for 65 seconds. The platens were opened, the sheet was removed and allowed to cool to 25° C. It was found to be compacted to a thickness of 0.040 inch or about ⅙ of its original thickness. There was no discoloration. The sheet was strong and similar to a piece of wool felt. Although dense, it was quite permeable and suitable for use as a filtering medium.

EXAMPLE 6

Example 5 was repeated except that after the initial compression to 0.020 inch and parting to 0.040 inch, the sheet was maintained for only 13 seconds. Its compacted thickness was 0.062 or about ¼ of its original thickness. It was softer, and more permeable to air than the product of Example 5 and thus illustrates fluid permeability control of the novel filtering product.

EXAMPLE 7

Example 5 was repeated except that the temperature of the platens was 200° C. A one-second precompression followed by ten seconds between the platens at 200° C. spaced at a distance of 0.040 inch gave a product having a thickness of 0.040 inch and apparently similar to the product of Example 5 in all respects.

EXAMPLE 8

A sheet of the product of Example 4, having a thickness of 0.490 inch, was placed between metal platens previously heated to a temperature of 180° C. The platens were immediately closed to a distance of 0.020 inch for a period of one second, then parted to a distance of 0.040 inch for a period of 45 seconds, and the compacted sheet was then removed and allowed to cool to 25° C. It was found to be compacted to a thickness of 0.042 inch. It was quite porous, not as strong as the product of Example 5, but quite suitable as a firm cushioning material or as a filtering medium.

EXAMPLE 9

Preparation of a stretch-set reticulated polymeric polyester polyurethane product A sheet of the product of Example 4, having a thickness of 0.125 inch, was placed on a wooden frame and stretched 100% in length and 100% in width, then clamped in this position. The frame, together with the stretched material was placed in a circulating air oven at a temperature of 160° C. for a period of 90 minutes. The frame was removed from the oven and allowed to cool to 25° C. The heat-set product in the form of a very thin diaphanous sheet, having a thickness of about 0.03 inch, was removed. It was permanently set in its stretched position. Examination indicated it to be completely composed of straight filaments all lying in a planar direction. In handle and drape it was very similar to a very sheer fabric. It possessed considerable "eye appeal" useful as a decorative material.

The following tables illustrate various compression ratios and the associated Poisson's ratio in compression. As can be observed, the Poisson's ratio represented by foams of greater than about 2.50 firmness offers the most improved products. This is evident from the properties of compressed foam as illustrated in Table VIII.

TABLE I.—COMPRESSION OF POLYURETHANE FOAM OF 10 P.P.I.

| Compression ratio, firmness | Height (in.) | Width (in.) | Length (in.) | Poisson's ratio |
|---|---|---|---|---|
| 1.0 (uncompr.) | 6.22 | 9.94 | 11.94 | |
| 1.46 | 4.25 | 10.28 | | 0.107 |
| | 4.25 | | 12.38 | 0.114 |
| 2.10 | 2.97 | 10.31 | | 0.071 |
| | 2.97 | | 12.31 | 0.059 |
| 2.67 | 2.33 | 10.28 | | 0.054 |
| | 2.33 | | 12.25 | 0.042 |
| 5.85 | 1.06 | 10.25 | | 0.037 |
| | 1.06 | | 12.19 | 0.025 |

TABLE II.—COMPRESSION OF POLYURETHANE FOAM OF 10 P.P.I.

| Compression ratio, firmness | Height (in.) | Width (in.) | Length (in.) | Poisson's ratio |
|---|---|---|---|---|
| 1.0 (uncompr.) | 6.16 | 4.95 | 4.90 | |
| 1.55 | 3.97 | 5.15 | | 0.112 |
| | 3.97 | | 5.10 | 0.115 |
| 2.08 | 2.96 | 5.07 | | 0.046 |
| | 2.96 | | 5.04 | 0.056 |
| 2.67 | 2.31 | 5.10 | | 0.048 |
| | 2.31 | | 5.15 | 0.082 |
| 5.87 | 1.05 | 5.10 | | 0.036 |
| | 1.05 | | 5.15 | 0.061 |

In Table III cell dimensions of compressed foams show the inherent variations in the width and height ratios of foamed polyurethane resin polyhedrons before and after compression. Most importantly, these figures show that at times it is necessary to make a reference to the original height of the polyhedron in order to determine the degree of compression.

TABLE III.—CELL DIMENSIONS OF COMPRESSED POLYURETHANE FOAM OF 10 P.P.I.

| Compression ratio, firmness | Cell Dimensions | |
|---|---|---|
| | Width (in.) | Height (in.) |
| 1.0 (uncompr.) | .16 | .19 |
| | .19 | .18 |
| | .18 | .21 |
| | .19 | .21 |
| | .18 | .20 |
| | .18 | .22 |
| 2.0 | .19 | .14 |
| | .20 | .16 |
| | .18 | .13 |
| | .20 | .15 |
| | .20 | .15 |
| | .17 | .14 |

TABLE IV.—COMPRESSION OF POLYURETHANE FOAM OF 45 P.P.I.

| Compression ratio, firmness | Height (in.) | Width (in.) | Length (in.) | Poisson's ratio |
|---|---|---|---|---|
| 1.0 (uncompr.) | 10.05 | 10.00 | 9.33 | |
| 2.22 | 4.53 | 10.31 | | 0.065 |
| | 4.53 | | 9.91 | 0.113 |
| 3.39 | 2.97 | 10.25 | | 0.036 |
| | 2.97 | | 9.88 | 0.080 |
| 4.29 | 2.34 | 10.09 | | 0.012 |
| | 2.34 | | 9.88 | 0.077 |
| 9.43 | 1.06 | 10.19 | | 0.021 |
| | 1.06 | | 9.88 | 0.066 |

TABLE V.—COMPRESSION OF POLYURETHANE FOAM OF 45 P.P.I.

| Compression ratio, firmness | Height (in.) | Width (in.) | Length (in.) | Poisson's ratio |
|---|---|---|---|---|
| 1.0 (uncompr.) | 9.85 | 5.00 | 4.95 | |
| 2.47 | 3.98 | 5.18 | | 0.060 |
| | 3.98 | | 5.05 | 0.034 |
| 3.34 | 2.95 | 5.15 | | 0.043 |
| | 2.95 | | 5.00 | 0.014 |
| 4.23 | 2.33 | 5.10 | | 0.026 |
| | 2.33 | | 5.00 | 0.013 |
| 9.38 | 1.05 | 5.15 | | 0.034 |
| | 1.05 | | 5.08 | 0.029 |

TABLE VI.—CELL DIMENSIONS OF TENSION-DEFORMED POLYURETHANE FOAM

| Percent original length | 10 p.p.i. | | 45 p.p.i. | |
|---|---|---|---|---|
| | Width (in.) | Length (in.) | Width (in.) | Length (in.) |
| 100 | .19 | .17 | .04 | .04 |
| | .16 | .14 | .04 | .04 |
| | .18 | .20 | .04 | .04 |
| | .20 | .15 | .05 | .04 |
| | .22 | .19 | .04 | .04 |
| | .18 | .15 | .04 | .04 |
| 150 | .27 | .15 | .07 | .03 |
| | .24 | .10 | .07 | .04 |
| | .27 | .11 | .07 | .03 |
| | .27 | .10 | .06 | .03 |
| | .25 | .13 | .06 | .03 |
| | .26 | .13 | .06 | .02 |
| 200 | | | .09 | .03 |
| | | | .09 | .02 |
| | | | .10 | .03 |
| | | | .10 | .03 |
| | | | .09 | .03 |
| | | | .09 | .04 |

TABLE VII.—TENSION-COMPRESSION-DEFORMED POLYURETHANE FOAM

All samples originally 8″ x 4″ x ⅛″

Permeability of non-deformed, reticulated controls:
10 p.p.i.—1,180 c.f.m./ft.² at .5 W.G.[1]
45 p.p.i.—462 c.f.m./ft.² at .5 W.G.[1]
80 p.p.i.—206 c.f.m./ft.² at .5 W.G.[1]

| Sample No. | P.p.i. | Dimensions after stretching | | | Thickness after compr. | Permeability[2] c.f.m./ft.² at .5 W.G. |
|---|---|---|---|---|---|---|
| | | L (in.) | W (in.) | Thk. (in.) | | |
| 1 | 10 | 8½ | 3¼ | .40 | .063 | 715 |
| 2 | 10 | 9 | 3 | .38 | | 1,050 |
| 3 | 10 | 8¾ | 3⅛ | .40 | .040 | 580 |
| 4 | 45 | 11½ | 2¾ | .275 | .058 | 200 |
| 5 | 45 | 12 | 2¾ | .28 | | 430 |
| 6 | 45 | 11⅞ | 2¾ | .270 | .029 | 62.5 |
| 7 | 45 | 8⅞ | 3⅛ | .360 | .065 | 207 |
| 8 | 45 | 9 | 3⅛ | .340 | | 430 |
| 9 | 45 | 9 | 3⅛ | .375 | .037 | 74.3 |
| 10 | 80 | 11¼ | 2⅞ | .270 | .064 | 113 |
| 11 | 80 | 12 | 2⅞ | .260 | | 183 |
| 12 | 80 | 11¼ | 2⅞ | .270 | .029 | 32 |
| 13 | 80 | 9 | 3⅛ | .330 | .040 | 31.8 |
| 14 | 80 | 9 | 3¼ | .355 | | 19.8 |
| 15 | 80 | 9 | 3⅛ | .330 | .071 | 77 |

[1] W.G.=Water gauge (water column).
[2] Results obtained using Frazier High Pressure Permeability Tester by procedure similar to ASTM D737-46.

TABLE VIII.—TYPICAL PHYSICAL PROPERTIES OF COMPRESSED SET RETICULATED POLYURETHANE FOAM ORIGINALLY OF ABOUT 90 P.P.I.

|  | Firmness 3 | Firmness 5 | Firmness 10 | Firmness 15 [1] |
|---|---|---|---|---|
| Tensile strength, p.s.i. | 50–70 | 80–105 | 160–200 | 230–270 |
| Elongation at break, percent | 300–400 | 250–350 | 250–350 | 200–300 |
| Tear strength, lb./in. | 7–9 | 10–13 | 20–27 | 27–35 |

[1] Firmness is defined as $F = \frac{T_o}{T_f}$ where $T_o$ is thickness, original and $T_f$ is thickness, final.

TABLE IX.—TYPICAL PERMEABILITY VALUES FOR COMPRESSED SET RETICULATED POLYURETHANE FOAM ORIGINALLY OF ABOUT 90 P.P.I.

| Firmness | Final thickness, inch | Permeability (c.f.m./ft.²) [1] At .5″ W.G. | At 10″ W.G. [2] |
|---|---|---|---|
| 3 | 1/8 | 150–200 | 1,400–1,600 |
| 3 | 1/4 | 85–120 | 800–1,000 |
| 5 | 1/8 | 65–100 | 700–900 |
| 5 | 1/4 | 40–55 | 500–675 |
| 10 | 1/8 | 20–30 | 275–375 |
| 10 | 1/4 | 10–14 | 130–190 |
| 15 | 1/8 | 4–8 | 60–110 |
| 15 | 1/4 | 2–3.8 | 30–57 |

[1] Results obtained using Frazier High Pressure Permeability Tester by a procedure similar to ASTM D737-46.
[2] W.G.=Water gauge (water column).

The products of this invention are useful as filtering media for both liquids and gases; as cushioning materials; as substitutes for felt (such as in papermaking applications); as textile materials or absorbent materials for liquids acting in the manner of chamois and in cases of variable density structures such as sound insulations.

It will be evident from the foregoing that the process of this invention may be applied to a variety of flexible isocyanate-derived polymer structures to alter and improve the properties thereof. Various reticulated starting materials are useful and available when produced according to the methods in the previously-mentioned applications. However, the reticulated polyvinyl chloride foams regain bulk under elevated temperature if compression set is the same as for the polyurethane plastics. The expanded structures undergoing treatment may vary in pore size, pliability, and other respects. Wide variation is contemplated in the nature of the isocyanate-derived polymer forming the porous structure. The heat-setting treatment may be applied so as to produce fixed structures deformed to varying degrees, depending on whether the intended application of the product primarily requires strength and maximum surface area, or is directed chiefly to cushioning qualities.

I claim:
1. A novel article of manufacture comprising a continuous body of a flexible, resilient, reticulated, polymeric polyurethane foam resin structure which is dimensionally stabilized by having been stretched and set with the normal configuration of the resin structure being uniformly deformed and set substantially to the maximum limit possible without destruction of the original physical state thereof.

2. The method of modifying the physical properties of a flexible, porous, reticulated, polymeric polyurethane foam which comprises stretching the polymeric material in at least one dimension substantially to the maximum limit and heating the stretched material to a temperature within the range of from about 100° C. up to a temperature immediately below its softening point for a time sufficient to impart thereto a permanent set.

References Cited

UNITED STATES PATENTS

| 3,025,200 | 3/1962 | Powers | 161—168 |
| 3,050,432 | 8/1962 | Weinbrenner et al. | 156—196 |
| 3,325,338 | 6/1967 | Geen | 161—89 |
| 3,328,505 | 6/1967 | Spencer | 264—321 |

FOREIGN PATENTS 911,995  12/1962  Great Britain.

OTHER REFERENCES

Rubber and Plastics Age, vol. 43, No. 2, February 1962, p. 141.

M. SUSSMAN, *Primary Examiner.*

R. H. CRISS, *Assistant Examiner.*

U.S. Cl. X.R.

161—168; 260—2.5; 264—291, 321